May 14, 1957 M. A. MÜLLER 2,791,927
DEVICE FOR THE AUTOMATIC CONTROL OF LATHE TOOLS
Filed Dec. 12, 1951 2 Sheets-Sheet 1
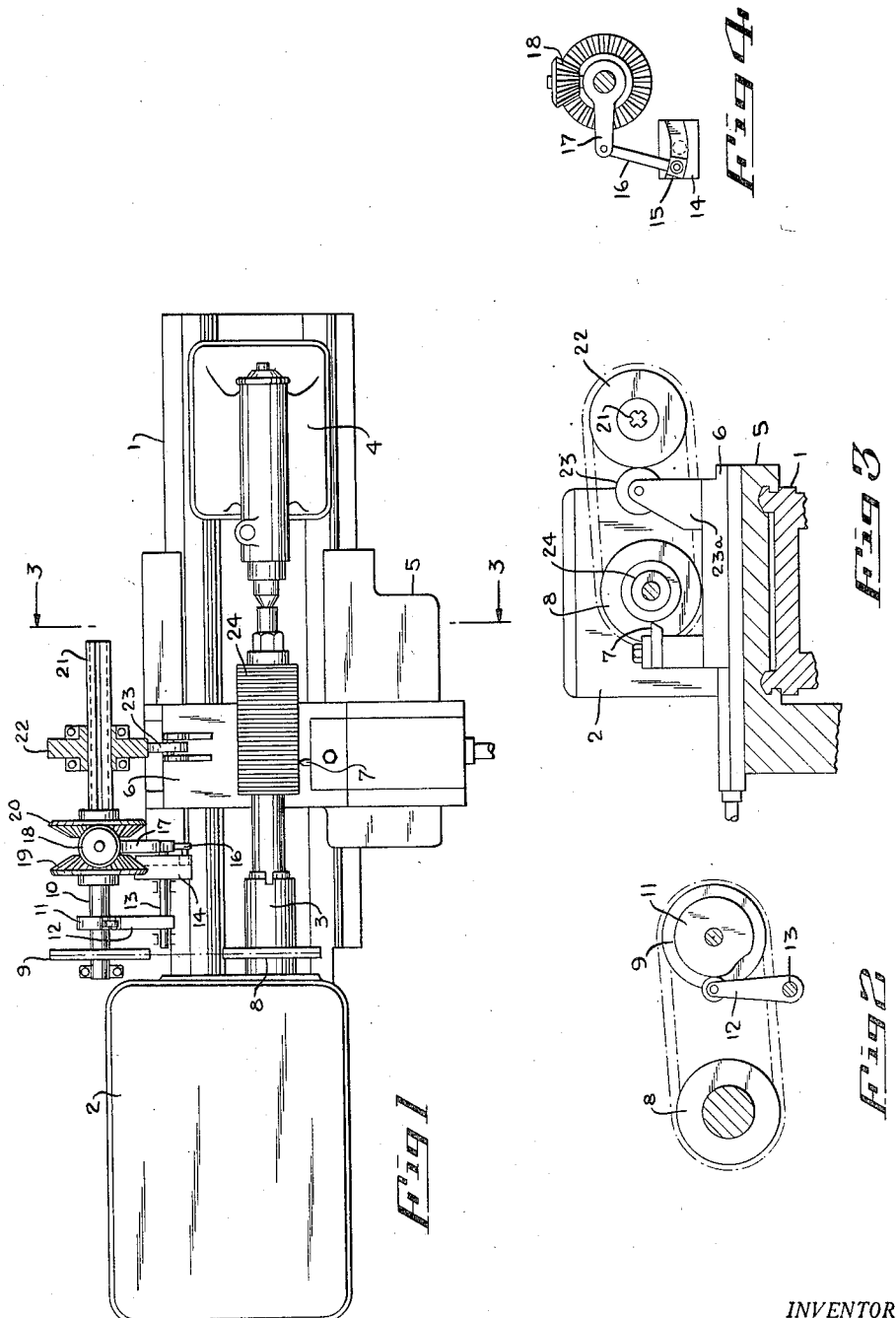
INVENTOR:
MAX ADOLF MÜLLER,
BY
HIS AGENTS.

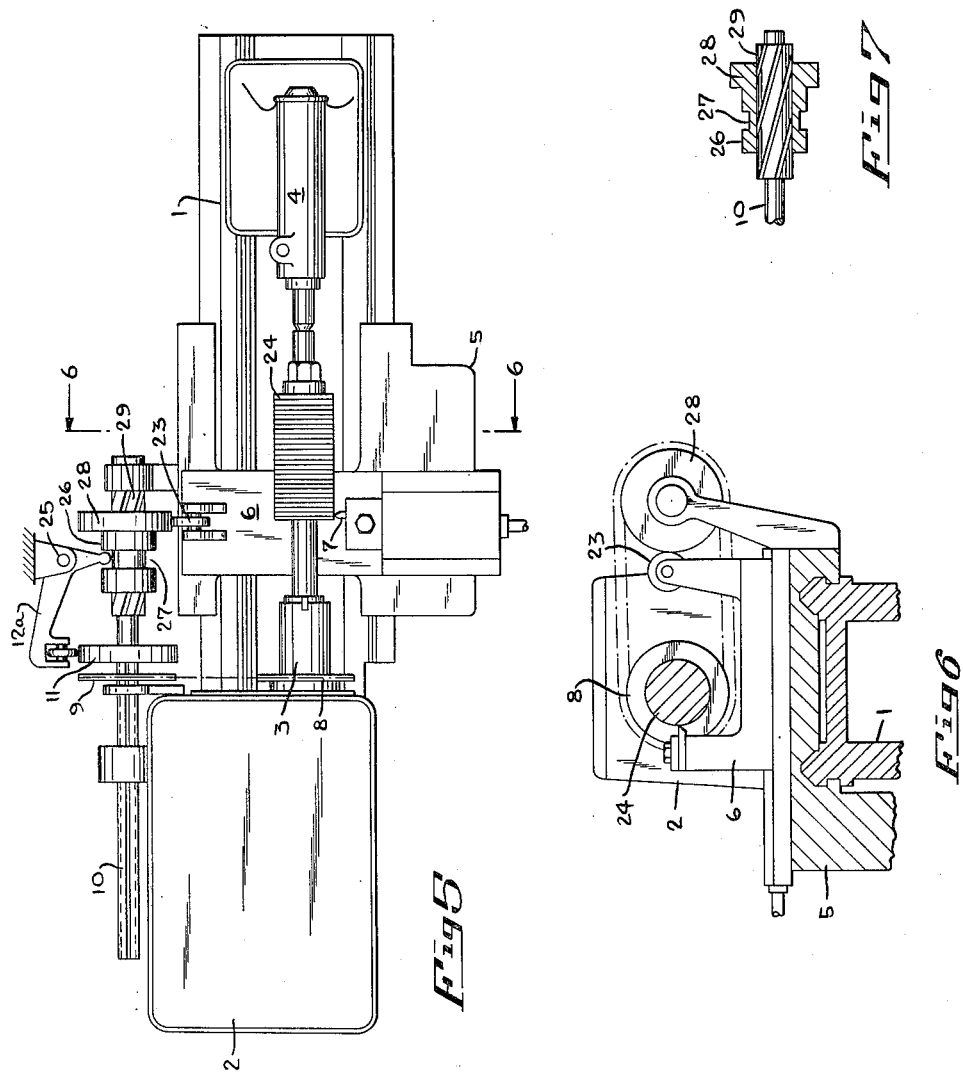

United States Patent Office 2,791,927
Patented May 14, 1957

---

2,791,927

DEVICE FOR THE AUTOMATIC CONTROL OF LATHE TOOLS

Max Adolf Müller, Cologne, Germany, assignor to Goetzewerke Friedrich Goetze Aktiengesellschaft, Burcheid, near Cologne, Germany Application December 12, 1951, Serial No. 261,335

Claims priority, application Germany December 14, 1950

2 Claims. (Cl. 82—19)

The invention relates to a device for the automatic control of the lathe tool for use in out-of-round or eccentric lathes, particularly for the production of piston rings.

Automatic eccentric turning work is performed in lathes by the aid of patterns, of which the curved surface controls the movement of the turning tool in its radial direction during the machining of the work piece.

This practice necessitates the provision of different patterns each time the out-of-round or eccentric shape of the work pieces is changed. This frequent change greatly reduces the economical production of the piston rings.

The piston rings are mostly made of grey cast iron and must be machined on the outer surface to provide a predetermined distribution of the radial pressure in the finished ring. Accordingly, the radial pressure on the open ends of the ring will be larger than the pressure at other places of their circumference. If, therefore, the distribution of the radial pressure in the ring is to be changed, or if a material having a different modulus of elasticity is used, the curvature of the pattern must be changed and a new pattern is required.

The main object of the invention, therefore, is the provision of a device on lathes provided with only one pattern for any type of eccentric turning, whereby the pattern is rotated synchronously with the work piece.

Another object of the invention is the provision of means which will permit a variation of the governing effect of the pattern on to the tool.

In principle, the pattern rotates with the same velocity as the main shaft of the lathe, so that both parts work with a synchronous rotation. However, the uniform rotation of the pattern is changed during rotation of the pattern, in such a manner, that the rotating surface of the same undergoes an acceleration or retardation during a predetermined period of rotation; accordingly, the eccentric turning of the work piece is shifted relative to the action of the fundamental curvature of the pattern.

Another object of the invention is the adjustment of the thereby resulting curve by a simple manipulation without a replacement of the pattern.

In compliance with these objects, the invention comprises a cam, which will be turned synchronously with the rotation of the main shaft of the lathe. A lever contacting this cam performs an oscillating movement during each turn of the lathe in conformity with the eccentricity of the cam. This oscillating movement will be mechanically transmitted to the rotating pattern to produce a change of its uniform rotation.

Therefore, a deviation of the eccentricity applied to the work piece will result which is different from the curvature of the pattern; this is effected by providing a predetermined dislocation of their surface points in the tangential and the radial directions, relative to the fundamental curvature of the pattern.

A further feature of the invention is the arrangement and the shape of the mechanical devices, which transmit the oscillating movement of the contacting lever to the rotating pattern in order to change the circumferential speed for a predetermined period of a revolution.

Several embodiments of the invention are illustrated in the attached drawing.

In the drawings:

Fig. 1 is a plan view of a lathe with a pattern, of which the movement is controlled by a cam;

Fig. 2 is a side view of the cam including the contacting lever;

Fig. 3 is a cross-section of the lathe on line 3—3 of Fig. 1;

Fig. 4 is a cross-section showing the means for the actuation of a planetary driving gear on line 4—4 of Fig. 1;

Fig. 5 is a plan view of a lathe for use with a movable pattern;

Fig. 6 is a cross-section of the lathe on line 6—6 of Fig. 5; and

Fig. 7 is a cross-section of the pattern.

As apparent from Figs. 1 to 4, the frame 1 of the lathe carries a housing 2 for the driving gear, the main shaft 3 and the tail stock 4. The main support 5 carries the cross-support 6 including the turning tool 7.

The difference from a customary lathe consists in the provision of an intermediate shaft 10, supported by the machine frame and rotating synchronously with the main shaft 3 by the use of a suitable transmission device.

This transmission device may consist of a wheel 8 supported on the main shaft 3 and a wheel 9 carried on the intermediate shaft 10. The two wheels are connected by a belt and have the same diameter; accordingly the wheels and the shafts rotate synchronously.

A cam 11 is fastened on shaft 10 and an oscillating lever 12 contacts the surface of cam 11. The axle 13 of the oscillating lever 12 is connected to a rocking member 14 provided with a slot hole, in which a link block 15 (Fig. 4) is adjustably placed. The link block is connected to one end of a control lever 16, whose other end is connected to an arm 17 swingable about shaft 10. The pinion 18a of a planetary wheel 18 is connected to the arm 17, so that the pinion 18a may perform a swinging movement about the intermediate shaft 10.

The planetary wheel 18 is a part of a differential gear and coacts with the two bevel gears 19 and 20. The bevel gear 19 is fixed on shaft 10 and the bevel gear 20 is fixed on the shaft 21, which has a cruciform cross-section.

Pattern 22 slides on shaft 21 and bypasses the main support during its movement in the longitudinal direction of the lathe. The pattern is contacted by the roll 23, borne in a plummer block 25a, fixed on the cross support 6.

The cross-support including roll 23 is pressed by springs or by a weight, not shown in the drawing, towards the pattern 22, so that the turning tool 7 follows the movements of the roll 23 in the cross-direction to the work piece 24 which may be, for instance, a series of piston rings fixed on the main shaft.

The device is operated as follows.

The work piece 24 and the pattern 22 normally rotate with equal angular speed. The speed of the pattern may be changed during one rotation by the curvature of the cam 11, so that an additional movement is applied to the pattern, whereby the peripheral speed of the pattern is accelerated or reduced in conformity with the movement of the transmitting device. The oscillating movement of the contacting lever 12 of the cam 11 is transmitted to the planetary gear 18 by the rocking member 14, which permits oscillation of the pinion 18a of the planetary gear 18, whereby synchronous running of the shafts 19 and 21 is excluded.

The degree of transmission may be changed by the displacement of the link block 15 in the slot hole of the rocking member 14. If the pivot of the link block coincides with the axle 13, the oscillation of the lever 13 no longer influences the arm 17. In this position, therefore, the eccentric turning of the work piece will be determined only by the form of the pattern. Accordingly, the link block can be fixed in its axial position.

However, if the link block 15 is located outside of axle 13, the turning of the cam 11 and the oscillation of the lever 12 will influence the movement of the pattern and therewith the eccentric turning of the tool. A change of the peripheral speed of the pattern may be effected by the planetary movement of gear 18 between the bevel gears 19 and 20. The additional turning movement of gear 18 exerts during one rotation of the pattern, an acceleration or retardation of the rotation of the pattern. This adjustment of a predetermined change in the speed of the surface of the pattern can be attained by simple manipulation, namely by fixing the link block in its position in the slot.

The construction illustrated in Figs. 5–7 is based on the same cooperation of cam 11 and the movement of the pattern 28; only the transmission parts are differently shaped. The contacting lever has the form of a cranked lever 12a oscillating on a pivot 25 fixed on the main support of the lathe.

Moreover, the intermediate shaft 10 which follows the displacement of the main support, is provided with sloping wedges 29, which serve as a guide for a bushing 26 connected to the pattern 28. The free end of one arm of the cranked lever 12a interlocks with a groove 27 in the bushing 26. Therefore, the oscillation of the lever 12a causes a rotation and a slide movement of pattern 28. This effects an additional rotational movement for the pattern, which causes an acceleration or a retardation of the rotating surface. The pattern is contacted again by a control roll 23 supported on the cross-support 6.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows.

1. In a device for effecting an eccentric turning operation in lathes provided with a pattern for the control of the movement of the turning tool, a main shaft carrying the work piece, an intermediate shaft parallel to said main shaft, a mechanical connection between said main shaft and said intermediate shaft to produce a synchronous rotation of the two shafts, a cam on said intermediate shaft, an oscillating lever contacting said cam, a shaft having a cruciform cross-section located in the axis of said intermediate shaft, a pattern slidable on said shaft, bevelled gears on the opposite ends of said intermediate shaft and said shaft having a cruciform cross-section, a planetary gear coacting with said bevel gears, an oscillating arm on said intermediate shaft, said planetary gear being connected to said oscillating arm, means connecting said oscillating lever with said oscillating arm to impart to said planetary gear a planetary movement about said bevel gears thereby imposing a rotative movement on said pattern in addition to synchronous rotation of the pattern cyclically accelerating and respectively retarding said pattern during each full turn of said intermediate shaft 2. A device for effecting an eccentric turning operation in lathes according to claim 1, comprising an axle parallel to said intermediate shaft, a crank disk and said oscillating lever fixed on said axle, a slit hole in said crank disk, a link block adjustable in said slit hole, a control lever connected to said link block and with said oscillating arm to control the planetary movement of the planetary gear for changing the amount of additional rotation imposed on the synchronous rotation of said pattern.

References Cited in the file of this patent

UNITED STATES PATENTS

| | | |
|---|---|---|
| 1,549,457 | Cumner | Aug. 11, 1925 |
| 1,700,327 | Mueller | Jan. 29, 1929 |
| 1,758,102 | Candee | May 13, 1930 |
| 1,916,581 | O'Brien | July 4, 1933 |
| 2,109,454 | Becker | Mar. 1, 1938 |
| 2,377,239 | Kasen | May 29, 1945 |

FOREIGN PATENTS

| | | |
|---|---|---|
| 116,700 | Great Britain | May 14, 1919 |
| 188,759 | Great Britain | Nov. 15, 1922 |